United States Patent
Yoshida et al.

(10) Patent No.: US 12,223,237 B2
(45) Date of Patent: Feb. 11, 2025

(54) GENERATION METHOD, ESTIMATION METHOD, GENERATOR, AND ESTIMATOR

(71) Applicant: Panasonic Intellectual Property Management Co., Ltd., Osaka (JP)

(72) Inventors: Hiroko Yoshida, Osaka (JP); Nobuo Hara, Osaka (JP); Koichi Wakitani, Toyama (JP); Akihisa Nakahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 867 days.

(21) Appl. No.: 17/323,941

(22) Filed: May 18, 2021

(65) Prior Publication Data
US 2021/0390227 A1 Dec. 16, 2021

(30) Foreign Application Priority Data
Jun. 11, 2020 (JP) .................. 2020-101907

(51) Int. Cl.
*G06F 30/20* (2020.01)
*B23K 26/244* (2014.01)
(Continued)

(52) U.S. Cl.
CPC ............ *G06F 30/20* (2020.01); *B23K 26/244* (2015.10); *B23K 26/32* (2013.01); *B23K 2101/18* (2018.08); *G06F 2111/10* (2020.01)

(58) Field of Classification Search
CPC ... G06F 30/20; G06F 2111/10; B23K 26/244; B23K 26/32; B23K 2101/18
(Continued)

(56) References Cited

U.S. PATENT DOCUMENTS 4,263,496 A * 4/1981 Medlar ............ B23K 15/0053
219/121.28
5,595,670 A * 1/1997 Mombo-Caristan ... B23K 26/06
219/121.64
(Continued)

FOREIGN PATENT DOCUMENTS

| JP | 2004-103674 | 4/2004 |
|---|---|---|
| JP | 2007-260743 | 10/2007 |

(Continued)

OTHER PUBLICATIONS

Liu et al. ("Model-Based Predictive Control of Weld Penetration in Gas Tungsten Arc Welding", IEEE, 2014, pp. 955-966) (Year: 2014).*

(Continued)

*Primary Examiner* — Iftekhar A Khan
(74) *Attorney, Agent, or Firm* — Wenderoth, Lind & Ponack, L.L.P.

(57) ABSTRACT

An experiment of processing a device is performed to acquire type 1 information and type 2 information indicating processing conditions, and type 3 information and type 4 information indicating results of the processing, derive a first relation between the type 1 information, the type 2 information, and the type 3 information, and a second relation between the type 1 information, the type 2 information, and the type 4 information, and generate and output a model that estimates the type 4 information indicating a result of the processing by using the first relation and the second relation with the type 2 information and the type 3 information that are measured during the processing as inputs.

9 Claims, 9 Drawing Sheets

(51) Int. Cl.
*B23K 26/32* (2014.01)
*B23K 101/18* (2006.01)
*G06F 111/10* (2020.01)

(58) Field of Classification Search
USPC .............................................................. 703/2
See application file for complete search history.

(56) References Cited

U.S. PATENT DOCUMENTS

| | | | | |
|---|---|---|---|---|
| 5,603,853 | A * | 2/1997 | Mombo-Caristan | .......................... B23K 26/1437 |
| | | | | 219/121.64 |
| 7,385,157 | B2 * | 6/2008 | Oda | ....................... B23K 26/24 |
| | | | | 219/121.64 |
| 10,155,285 | B2 * | 12/2018 | Fujiwara | .............. B23K 26/322 |
| 10,286,491 | B2 * | 5/2019 | Nakagawa | ............. B23K 26/22 |
| 10,328,513 | B2 * | 6/2019 | Lin | ........................ B23K 28/02 |
| 10,835,993 | B2 * | 11/2020 | Matsuoka | ............ B23K 26/244 |
| 11,203,085 | B2 * | 12/2021 | Tao | ....................... B23K 26/244 |
| 11,628,516 | B2 * | 4/2023 | Kobayashi | ......... B23K 26/0626 |
| | | | | 219/121.61 |
| 2004/0026381 | A1 * | 2/2004 | Tsukamoto | ............ B23K 26/24 |
| | | | | 219/121.6 |
| 2004/0099642 | A1 * | 5/2004 | Sonoda | ............... B23K 26/244 |
| | | | | 219/121.64 |
| 2006/0163221 | A1 * | 7/2006 | Makase | ............... B23K 26/082 |
| | | | | 219/121.64 |
| 2010/0206856 | A1 * | 8/2010 | Tanaka | ................... B23K 26/03 |
| | | | | 219/121.64 |
| 2010/0276402 | A1 * | 11/2010 | Richard | .............. B23K 9/0286 |
| | | | | 219/121.64 |
| 2011/0192825 | A1 * | 8/2011 | Calefati | ................. B23K 31/12 |
| | | | | 219/121.64 |
| 2011/0208495 | A1 * | 8/2011 | Yuta | ...................... G06F 18/214 |
| | | | | 703/2 |
| 2012/0325786 | A1 * | 12/2012 | Tolling | ................. B23K 9/0213 |
| | | | | 219/121.64 |
| 2013/0119025 | A1 * | 5/2013 | Lee | ...................... B23K 26/244 |
| | | | | 219/121.64 |
| 2013/0136540 | A1 * | 5/2013 | Jones | .................... B23K 33/006 |
| | | | | 219/61 |
| 2013/0190920 | A1 * | 7/2013 | Michishita | ........... G05B 19/408 |
| | | | | 700/175 |
| 2014/0048518 | A1 * | 2/2014 | Ogura | .................... B23K 26/22 |
| | | | | 219/121.64 |
| 2015/0145241 | A1 * | 5/2015 | Asami | .................. B23K 26/282 |
| | | | | 219/121.64 |
| 2015/0283648 | A1 * | 10/2015 | Hisada | .................... B23K 26/22 |
| | | | | 219/121.64 |
| 2015/0336212 | A1 * | 11/2015 | Hisada | ................. B23K 26/082 |
| | | | | 219/121.64 |
| 2016/0354867 | A1 * | 12/2016 | Matsuoka | .............. B23K 26/24 |
| 2018/0043453 | A1 * | 2/2018 | Yamasaki | ............ B23K 9/1081 |
| 2018/0221989 | A1 * | 8/2018 | Matsuoka | ........... B23K 26/082 |
| 2018/0285317 | A1 * | 10/2018 | Nishida | .................... G06F 30/20 |

FOREIGN PATENT DOCUMENTS

| | | |
|---|---|---|
| JP | 2008-161896 | 7/2008 |
| JP | 2009-230209 | 10/2009 |
| JP | 4539619 B | 9/2010 |
| WO | 2017/022238 | 2/2017 |

OTHER PUBLICATIONS

Na et al. ("Nonlinear Identification of Laser Welding Process", IEEE, 2010, pp. 927-934) (Year: 2010).*

Kovacevic et al. ("Neurofuzzy Model-Based Weld Fusion State Estimation", IEEE, 1997, 30-42) (Year: 1997).*

* cited by examiner

GENERATION METHOD, ESTIMATION METHOD, GENERATOR, AND ESTIMATOR

BACKGROUND

1. Technical Field

The present disclosure relates to a generation method, an estimation method, a generator, and an estimator.

2. Description of the Related Art

In a related art, a model related to device processing has been used. For such a model, many cases have been reported in which a parameter of an objective variable (output variable) is estimated from the parameters of explanatory variables (input variables). If a physical model based on an actual physical phenomenon can be constructed, it is possible to estimate with high accuracy and to suppress the measurement man-hours required for modeling by estimating the parameters of objective variables using this physical model.

On the other hand, when it is difficult to construct a physical model, for example, a method is known in which an input/output relation is assumed by a polynomial model using a large amount of accumulated measurement data and estimated by fitting. An estimation method of combining these two methods has also been proposed (see Japanese Patent No. 4539619).

SUMMARY

A model generation method according to one aspect of the present disclosure is a generation method executed by a processor using a memory, the method including: performing an experiment of processing a device to acquire type 1 information, type 2 information, type 3 information, and type 4 information, the type 1 information and the type 2 information each indicating processing conditions, the type 3 information and the type 4 information each indicating a result of the processing, deriving a first relation between the type 1 information, the type 2 information, and the type 3 information, and a second relation between the type 1 information, the type 2 information, and the type 4 information, and generating and outputting a model that estimates the type 4 information indicating a result of the processing by using the first relation and the second relation with the type 2 information and the type 3 information measured during the processing as inputs.

A generator according to one aspect of the present disclosure includes a processor, and a memory that is connected to the processor, in which the processor is configured to, by using the memory, perform an experiment of processing a device to acquire type 1 information, type 2 information, type 3 information, and type 4 information, the type 1 information and the type 2 information each indicating processing conditions, the type 3 information and the type 4 information each indicating a result of the processing, derive a first relation between the type 1 information, the type 2 information, and the type 3 information, and a second relation between the type 1 information, the type 2 information, and the type 4 information, and generate and output a model that estimates the type 4 information indicating a result of the processing by using the first relation and the second relation with the type 2 information and the type 3 information that are measured during the processing as inputs.

These comprehensive or specific aspects may be realized in a recording medium such as a system, a method, an integrated circuit, a computer program or a computer-readable CD-ROM, or may be realized by any combination of a system, a method, an integrated circuit, a computer program, and a recording medium.

DETAILED DESCRIPTIONS

Figure 1:
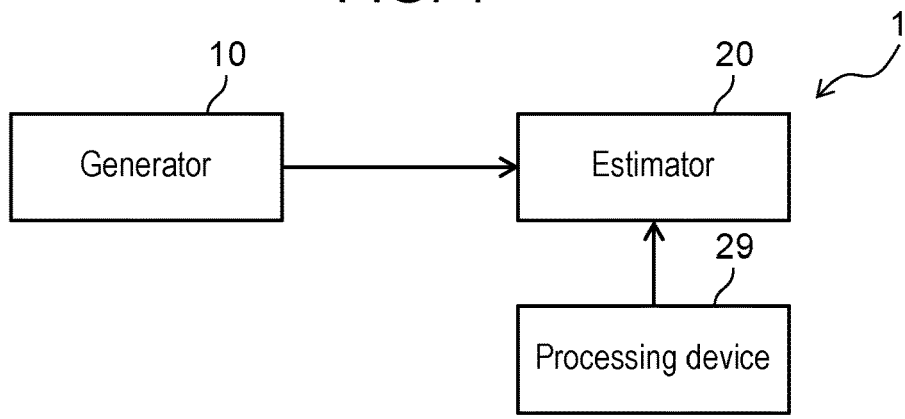
FIG. 1 is an explanatory diagram illustrating a configuration of a system according to an exemplary embodiment.

All of the methods in a related art are based on the premise that the measurement data of the parameters of explanatory variables are collected inline during processing of a device.

On the other hand, in order to obtain a model that can estimate objective variables with high accuracy, it is assumed that the explanatory variables include parameters for which measurement data is not collected inline. In this case, in order to be able to utilize the model inline, it is necessary to take measures such as combining another experimental design with a parameter for which measurement data is not collected inline as an output variable.

However, even if such a measure is taken, it is assumed that the input variable of another experimental design cannot generate an experimental point as planned due to the nature of the variable. Further, even if experimental points can be generated as planned, there is a problem that the number of experiments required for model generation is doubled because it is necessary to carry out the experimental design twice.

The present disclosure has been made in view of such problems of the prior art, and an object of the present disclosure is to provide a generation method of generating a model that appropriately estimates the information indicating a result of processing.

A generation method according to one aspect of the present disclosure is a generation method executed by a processor using a memory, the method including: performing an experiment of processing a device to acquire type 1 information and type 2 information indicating processing conditions, and type 3 information and type 4 information indicating results of the processing, deriving a first relation between the type 1 information, the type 2 information, and the type 3 information, and a second relation between the type 1 information, the type 2 information, and the type 4 information; and generating and outputting a model that estimates the type 4 information indicating a result of the processing by using the first relation and the second relation with the type 2 information and the type 3 information measured during the processing as inputs.

The generation method according to one aspect of the present disclosure can generate a model that appropriately estimates the information indicating a result of processing, as illustrated below.

According to the above aspect, it is possible to obtain a model that estimates the type 4 information during the processing from the type 2 information and the type 3 information obtained during the processing by using the relation between the type 1 information, the type 2 information, the type 3 information, and the type 4 information obtained from the experiment. If this model is used, even if the type 4 information cannot be obtained during processing, if the type 2 information and the type 3 information can be obtained during processing, the type 4 information during processing can be obtained. Four kinds of information can be obtained by estimation. As described above, according to the above generation method, it is possible to generate a model that appropriately estimates the information indicating a result of processing. Further, when estimating the type 4 information, it is not necessary to perform a new experiment using the type 4 information as an output variable. Therefore, there is an effect that it is possible to avoid an increase in the number of experiments in order to acquire information that cannot be obtained during the processing.

For example, the first relation may be expressed with a first equation that outputs the type 3 information with the type 1 information and the type 2 information as inputs, the second relation may be expressed with a second equation that outputs the type 4 information with the type 1 information and the type 2 information as inputs, and the model may include a third equation that is derived from the first equation and outputs the type 1 information with the type 2 information and the type 3 information as inputs.

According to the above aspect, it is possible to obtain the type 4 information by using the third equation derived from the first equation with equation modification. Therefore, according to the above generation method, it is possible to more easily generate a model that appropriately estimates the information indicating the result of the processing.

For example, the model may include a model that further includes the second equation, and that acquires the type 4 information that is output by the second equation with the type 1 information that is output by the third equation with the type 2 information and the type 3 information that are measured during the processing as inputs, and the type 2 information that is measured during the processing as inputs.

According to the above aspect, it is possible to easily estimate the type 1 information with the third equation from the measured values of the type 2 information and the type 3 information, and it is possible to estimate the type 4 information with the second equation from the estimated type 1 information and the measured value of the type 2 information. Therefore, according to the above generation method, it is possible to more easily generate a model that appropriately estimates the information indicating the result of the processing.

For example, the type 1 information and the type 4 information may be predetermined information as information that is not measured during the processing, the type 2 information and the type 3 information may be predetermined information as information that is measured during the processing.

According to the above aspect, when there is information that is not measured in the information indicating processing conditions and there is information that is not measured in the information indicating a result of processing, it is possible to appropriately estimate the information indicating the result of the processing. Therefore, according to the above generation method, even if there is information that is not measured during the processing, it is possible to generate a model that appropriately estimates the information indicating the result of the processing.

For example, the processing may be laser welding, the type 1 information may include a gap width between plates to be welded in the laser welding, the type 2 information may include a laser scan speed in the laser welding, the type 3 information may include a surface welding width of a laser welded portion in the laser welding, and the type 4 information may include an interface welding width of a laser welded portion in the laser welding.

According to the above aspect, it is possible to more easily generate a model that appropriately estimates the information indicating a result of processing in laser welding.

The estimation method according to one aspect of the present disclosure includes inputting the type 2 information and the type 3 information that are measured during the processing into the model that is output by the generation method of any one of claims 1 to 5, and outputting the type 4 information that is output by inputting the type 2 information and the type 3 information into the model as estimation information that estimates a result of the processing.

According to the above aspect, it is possible to appropriately estimate the information indicating the result of the processing by inputting the type 2 information and type 3 information obtained during the processing into the model.

A generator according to one aspect of the present disclosure includes a processor, and a memory that is connected to the processor, in which the processor is configured to, by using the memory, perform an experiment of processing a device to acquire type 1 information and type 2 information indicating processing conditions, and type 3 information and type 4 information indicating results of the processing, derive a first relation between the type 1 information, the type 2 information, and the type 3 information, and a second relation between the type 1 information, the type 2 information, and the type 4 information, and generate and output a model that estimates the type 4 information indicating a result of the processing by using the first relation and the second relation with the type 2 information and the type 3 information that are measured during the processing as inputs.

According to this, the same effect as the above-mentioned generation method is obtained.

The estimator according to one aspect of the present disclosure includes a processor and a memory that is connected to the processor, in which the processor is configured to, by using the memory, output the type 4 information that is output by inputting the type 2 information and the type 3 information that are measured during the processing into the model that is output by the generator of claim 7, as estimation information estimating a result of the processing.

According to this, the same effect as the above estimation method is obtained.

These comprehensive or specific aspects may be realized in a recording medium such as a system, a device, an integrated circuit, a computer program or a computer-readable CD-ROM, or may be realized by any combination of a system, a device, an integrated circuit, a computer program, or a recording medium.

Hereinafter, exemplary embodiments will be specifically described with reference to drawings.

All of the exemplary embodiments described below illustrate comprehensive or specific examples. Numerical values, shapes, materials, components, arrangement positions and connection forms of components, steps, order of steps, and the like illustrated in the following exemplary embodiments are examples, and are not intended to limit the present disclosure. Further, among the components in the following exemplary embodiments, components not described in the independent claims indicating the highest concept are described as arbitrary components.

Exemplary Embodiment

In the present exemplary embodiment, a generation method of generating a model that appropriately estimates the information indicating a result of processing will be described.

First, the process of device processing will be described. Here, a laser welding process in a production line will be described as an example of device processing, but the application of the present exemplary embodiment is not limited thereto.

Generally, in the process of device processing, the quality of the process is evaluated. Quality evaluation is performed by evaluating information indicating the processing quality of the device, more specifically, a physical quantity related to the processing quality of the device. However, the physical quantity is not always measurable and may not be measurable.

For example, in a laser welding process on a production line, joint strength is one of the indexes for evaluating process quality. If the joint strength is measured inline, there is an advantage that it may be linked to control for preventing defects of the product produced through the process.

However, joint strength is virtually difficult or impossible to measure inline. Therefore, the joint strength must be evaluated by a joint strength evaluation test performed offline.

Further, the joint strength has a correlation with the interfacial melting area between the plate materials to be welded, and the interfacial melting area can be calculated by an interface welding width and a welding distance. Therefore, if the interface welding width between the plate materials can be estimated, it can be linked to the evaluation of the joint strength. However, the current situation is that the interface welding width is not measured inline.

In the system of the present exemplary embodiment, it is possible to evaluate the processing quality of the device by estimating the processing quality of the device from the measurable information in the information indicating processing conditions and the measurable information in the information indicating a result of processing. According to this method, when the information indicating the processing quality of the device is not directly measured, the information can be obtained by estimation.

Hereinafter, a model generation method of generating a model that estimates the information indicating the processing quality of the device from the information indicating processing conditions and the information indicating a result of processing, and a method of estimating the above information using the above model will be described.

FIG. 1 is an explanatory diagram illustrating a configuration of system 1 according to the present exemplary embodiment.

As illustrated in FIG. 1, system 1 includes generator 10 and estimator 20. Estimator 20 is connected to processing device 29.

Generator 10 is a device that generates a model that estimates the information indicating a result of processing of the device. Generator 10 generates a model (also referred to as an estimation model) that estimates the information indicating the result of the processing of device based on the information obtained by performing a device processing experiment by processing device 29. Generator 10 provides the generated estimation model to estimator 20. Generator 10 executes the above processing offline.

Estimator 20 is a device that estimates the information indicating the result of the processing of the device. Estimator 20 acquires information indicating the processing conditions of the device and information indicating the result of the processing of the device from processing device 29 and estimates the information indicating the result of the processing of the device by inputting the acquired information into the estimation model. Estimator 20 executes the above processing inline.

processing device 29 is a device that processes the device. Specifically, the processing of the device includes laser welding of the device, sputtering, and the like.

Figure 2:
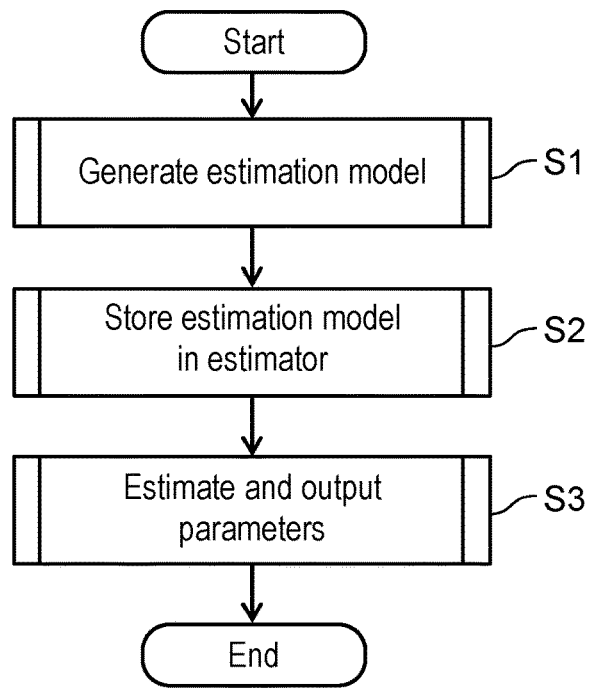
FIG. 2 is an explanatory diagram illustrating processing of the system according to the exemplary embodiment.

FIG. 2 is an explanatory diagram illustrating processing of system 1 according to the present exemplary embodiment.

As illustrated in FIG. 2, in step S1, generator 10 generates an estimation model offline that estimates the information indicating the result of the processing of the device. At this time, generator 10 generates the estimation model by using the information obtained by performing a processing experiment.

In step S2, generator 10 stores the estimation model generated in step S1 in estimator 20.

In step S3, estimator 20 estimates and outputs information (parameters) indicating the result of the processing inline by using the estimation model stored in step S2. At this time, estimator 20 estimates the above information by using the information obtained as a result of actually processing the device.

Hereinafter, the configurations and processing of generator 10 and estimator 20 will be described.

Generator 10

Figure 3:
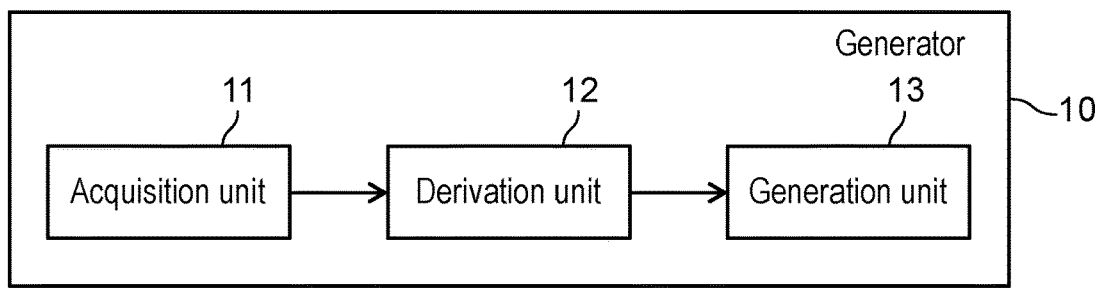
FIG. 3 is a block diagram illustrating a functional configuration of a generator according to the exemplary embodiment.

FIG. 3 is a block diagram illustrating a functional configuration of generator 10 according to the present exemplary embodiment.

As illustrated in FIG. 3, generator 10 includes acquisition unit 11, derivation unit 12, and generation unit 13. Generator 10 can be realized by a general computer device. Each functional unit included in generator 10 can be realized by executing a program by a processor (for example, a central processing unit (CPU)) (not illustrated) included in generator 10 using a memory.

Acquisition unit 11 is a functional unit that performs an experiment of processing the device and acquires a first parameter and a second parameter indicating processing conditions and a third parameter and a fourth parameter indicating the result of the processing. The first parameter, the second parameter, the third parameter, and the fourth parameter are also referred to as type 1 information, type 2 information, type 3 information, and type 4 information, respectively. The device processing experiment is an experiment that assumes the processing of the device before the device processing, and is performed offline. The device processing experiment includes, for example, an actual machine experiment in which a process similar to the processing process in the production line is actually performed in another environment, or a simulation experiment in which a process simulating the processing process in the production line is performed by computer simulation.

When the above parameters are acquired by an actual machine experiment, acquisition unit 11 may acquire the result of the actual machine experiment performed in an experimental device different from generator 10, from the device. At that time, acquisition unit 11 may control the experimental device.

When acquisition unit 11 acquires the above parameters by a simulation experiment, acquisition unit 11 may execute the simulation experiment by using the computer resources of generator 10.

In addition, acquisition unit 11 acquires experimental design model 105 including the set of parameters used in the experiment. Experimental design model 105 is used in experiments to acquire the third and fourth parameters.

Derivation unit 12 is a functional unit that derives a relation between the first parameter, the second parameter, the third parameter, and the fourth parameter. Specifically, derivation unit 12 derives a relation (also referred to as a first relation) between the first parameter, the second parameter, and the third parameter. Further, derivation unit 12 derives a relation (also referred to as a second relation) between the first parameter, the second parameter, and the fourth parameter.

The first relation is expressed with, for example, a first statistical model equation (also referred to as a first equation) that outputs a third parameter with the first parameter and the second parameter as inputs. Further, the second relation is expressed with a second statistical model equation (also referred to as a second equation) that outputs a fourth parameter with the first parameter and the second parameter as inputs.

Generation unit 13 is a functional unit that generates and outputs an estimation model, which is a model that estimates the fourth parameter indicating a result of the processing with the second parameter and the third parameter that are measured inline when processing device 29 actually processes the device, as inputs. Generation unit 13 estimates the fourth information by using the first relation and the second relation based on the estimation model.

The estimation model includes a third statistical model equation (also referred to as a third equation) when the first relation is expressed with the first statistical model equation and the second relation is expressed with the second statistical model equation. The third statistical model equation is an equation that outputs the first parameter with the second parameter and the third parameter that are derived from the first statistical model equation as inputs.

The estimation model includes the second statistical model equation as well as the third statistical model equation. The estimation model includes a model that acquires the first parameter output by the third statistical model equation with the second parameter and the third parameter that are measured during the processing as inputs, and the fourth parameter output by the second statistical model equation with the second parameter measured during the processing as an input.

The first parameter and the second parameter may be predetermined information as information that is not measured during processing. Further, the second parameter and the third parameter may be predetermined information as information to be measured during processing. Information that is not measured during processing includes, for example, information that can be technically measured during processing but is not actually measured due to restrictions such as the cost or time required for measurement. In addition, the information that is not measured during processing may include information that is technically difficult or impossible to be measured during processing.

Hereinafter, a method of generating an estimation model by derivation unit 12 will be described.

Figure 4:
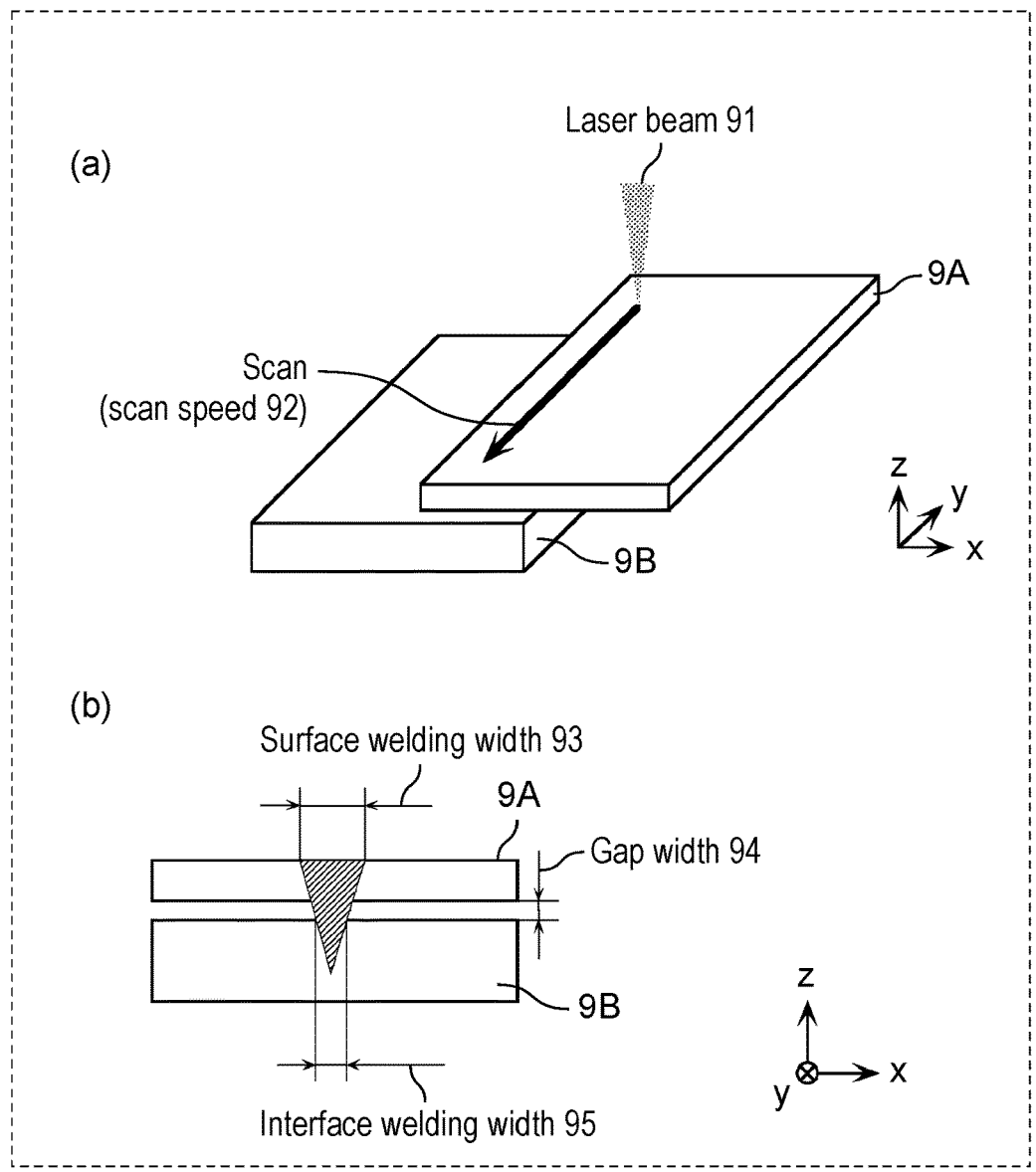
FIG. 4 is an explanatory diagram illustrating parameters related to a laser welding process.
Figure 5:
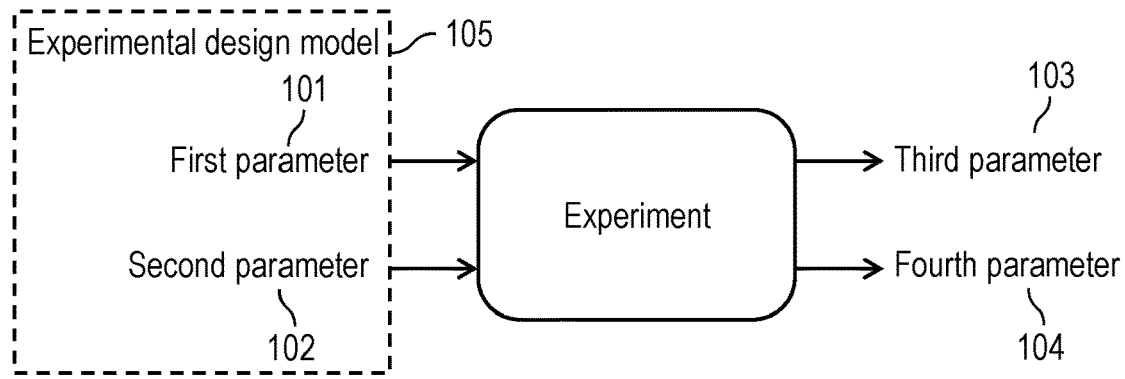
FIG. 5 is an explanatory diagram illustrating a relation between first to fourth parameters in an experiment according to the exemplary embodiment.

FIG. 4 is an explanatory diagram illustrating parameters related to the laser welding process. FIG. 5 is an explanatory diagram illustrating the relation between the first parameter to the fourth parameter in the experiment according to the present exemplary embodiment. The first parameter to the fourth parameter will be described with reference to FIGS. 4 and 5.

FIG. 4A schematically illustrates a state of a laser welding process in which processing device 29 welds plate material 9A and plate material 9B by laser welding. As illustrated in FIG. 4A, plate material 9A and plate material 9B are disposed so as to partially overlap each other. Processing device 29 irradiates an area where plate material 9A and plate material 9B overlap while scanning laser beam 91.

FIG. 4B schematically illustrates the state of the cross section of plate material 9A and plate material 9B welded by laser welding by processing device 29. As illustrated in FIG. 4B, between plate material 9A and plate material 9B, the portion irradiated with laser beam 91 is welded. In the welded portion between plate material 9A and plate material 9B, the width of the upper surface of plate material 9A (that is, the surface viewed from a z-axis plus direction) is referred to as surface welding width 93, and the width at the interface between plate material 9A and plate material 9B is referred to as interface welding width 95. Further, there is a minute gap having gap width 94 between plate material 9A and plate material 9B.

Next, first parameter 101 to fourth parameter 104 and experimental design model 105 used for generating an estimation model will be described with reference to FIG. 5.

First parameter 101 is a parameter indicating a processing condition, and is a parameter that is not measured inline due to cost or time constraints. First parameter 101 is a parameter necessary for estimating information indicating the result of the processing with high accuracy.

First parameter 101 includes, for example, gap width 94 between plate materials 9A and 9B to be welded. Gap width 94 can be controlled by using a jig in an offline experiment and can be controlled by setting simulation conditions in a simulation experiment.

Second parameter 102 is a parameter indicating a processing condition and is a parameter that is measured inline. Second parameter 102 includes, for example, laser scan speed 92.

Experimental design model 105 is information including parameters (first parameter 101 and second parameter 102) used in the experiment. Experimental design model 105 is generated based on the upper and lower limit values of the values that can be taken by each of first parameter 101 and the second parameter 102 in the experiment, which are set in advance. Experimental design model 105 includes setting information of values (also referred to as experimental point conditions) taken by each of first parameter 101 and the second parameter 102 in the experiment. As a result of performing the experiment under first parameter 101 and second parameter 102 set according to the experimental point conditions illustrated in experimental design model 105, third parameter 103 and fourth parameter 104 are output.

Third parameter 103 is information indicating the result of processing, and is a parameter that is measured inline. Third parameter 103 includes, for example, surface welding width 93 of the laser welded portion.

Fourth parameter 104 is information indicating the result of the processing, and is a parameter that is not measured inline due to cost or time constraints. Fourth parameter 104 is a characteristic parameter related to a quality of the processing. Fourth parameter 104 includes, for example, interface welding width 95 at the interface between plate materials 9A and 9B of the laser welded portion. To directly measure interface welding width 95, for example, there is a method of cutting a work piece offline and measuring on the cut surface, but such measurement is difficult or impossible inline.

Next, the first statistical model equation to the third statistical model equation and the estimation model will be described.

Figure 6:
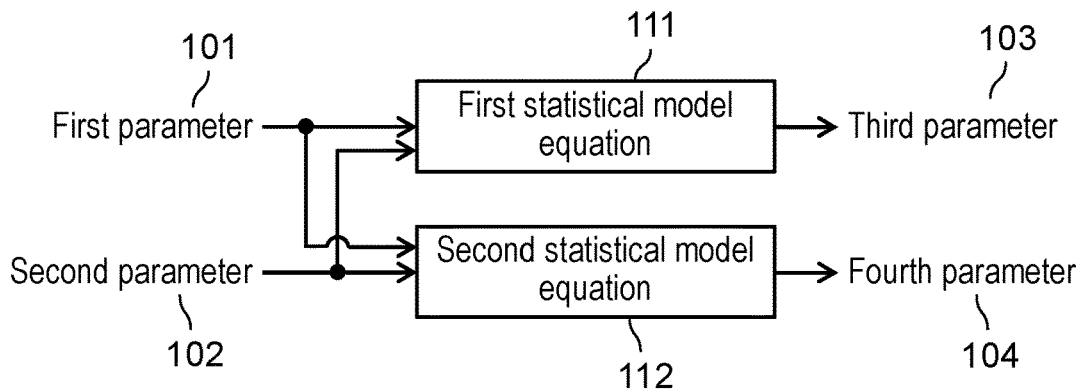
FIG. 6 is an explanatory diagram illustrating a relation between the first to fourth parameters and first and second statistical model equations derived by generator according to the exemplary embodiment.
Figure 7:
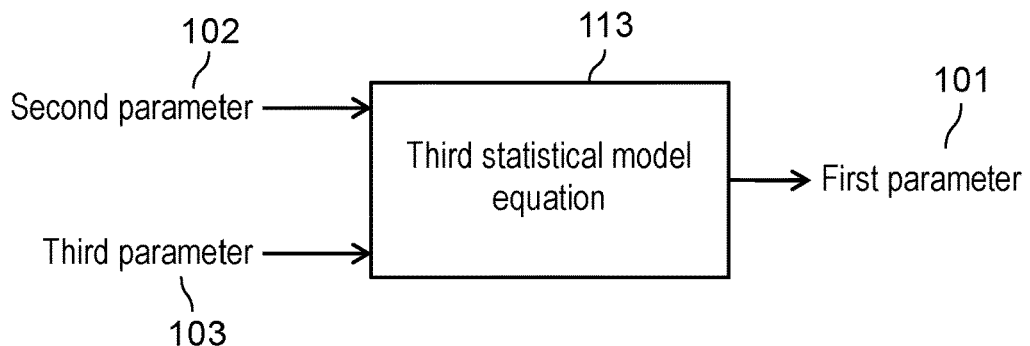
FIG. 7 is an explanatory diagram illustrating a relation between the first to third parameters and a third statistical model equation derived by generator according to the exemplary embodiment.
Figure 8:
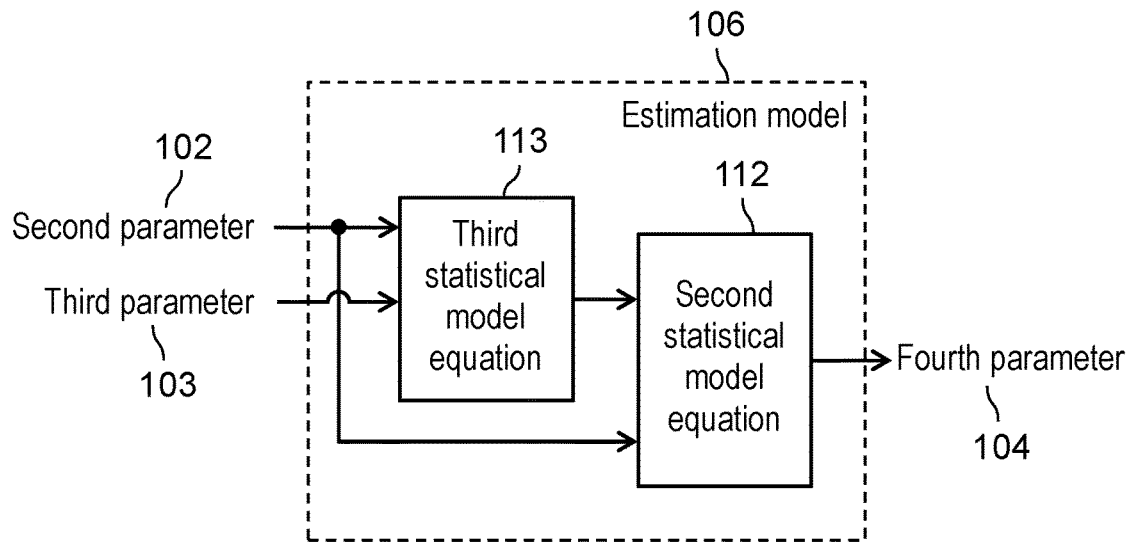
FIG. 8 is an explanatory diagram illustrating an estimation model generated by generator according to the exemplary embodiment.

FIG. 6 is an explanatory diagram illustrating the relation between the first parameter to the fourth parameter and the first statistical model equation and the second statistical model equation derived by generator 10 according to the present exemplary embodiment. FIG. 7 is an explanatory diagram illustrating the relation between the first parameter to the third parameter and the third statistical model equation derived by generator 10 according to the present exemplary embodiment. FIG. 8 is an explanatory diagram illustrating an estimation model generated by generator 10 according to the present exemplary embodiment.

Derivation unit 12 uses the set of first parameter 101 to fourth parameter 104 obtained by the experiment to derive first statistical model equation 111 and second statistical model equation 112 by statistical modeling based on experimental design model 105. Here, first statistical model equation 111 is a model equation in which first parameter 101 and second parameter 102 are input variables (explanatory variables) and third parameter 103 is an output variable (objective variable). Second statistical model equation 112 is a model equation in which first parameter 101 and second parameter 102 are input variables (explanatory variables) and fourth parameter 104 is an output variable (objective variable).

That is, first statistical model equation 111 and second statistical model equation 112 can be expressed in the form illustrated in the following (equation 1) (see FIG. 6).

First statistical model equation 111: third parameter=$f_1$(first parameter, second parameter)

Second statistical model equation 112: fourth parameter=$f_2$(first parameter, second parameter)

Equation 1

By the way, fourth parameter 104, which is the objective variable, is used for the evaluation of the process, but fourth parameter 104 is a parameter that is not measured inline, and is estimated by using second statistical model equation 112.

However, since first parameter 101, which is one of the input variables for second statistical model equation 112, is also a parameter that is not measured inline, first parameter 101 also needs to be estimated.

Therefore, as a method of estimating first parameter 101, first statistical model equation 111 is used. In first statistical model equation 111, first parameter 101 and the second parameter 102 are input variables, and third parameter 103 is an output variable. First statistical model equation 111 can be converted into an equation in which second parameter 102 and third parameter 103 are input variables and first parameter 101 is an output variable by solving an algebraic equation with first parameter 101 as an unknown. The equation thus converted (corresponding to third statistical model equation 113) can be expressed in the form illustrated in (Equation 2) (see FIG. 7). When deriving the third statistical model equation, if the third statistical model equation cannot be determined without appropriate restriction information, appropriate restriction information is introduced.

Third statistical model equation 113: First parameter= $f_1^{-1}$(second parameter, third parameter)

Equation 2

That is, first parameter 101 is calculated by third statistical model equation 113 including second parameter 102 and third parameter 103.

By substituting (Equation 2) with first parameter 101 in second statistical model equation 112 of (Equation 1) (that is, both first parameter 101 and second parameter 102 are input variables), fourth parameter 104 can be estimated by second statistical model equation 112.

That is, fourth parameter 104 can be expressed in the following form (Equation 3) (see FIG. 8).

Fourth parameter=$f_2(f_1^{-1}$(second parameter, third parameter), second parameter)

Equation 3

As described above, estimation model 106 is a model capable of outputting fourth parameter 104 when second parameter 102 and third parameter 103 are input.

Therefore, if second parameter 102 and third parameter 103 acquired by the inline measurement are input to estimation model 106, it is possible to estimate fourth parameter 104 as information indicating the result of the processing that is the target of the inline measurement.

The processing of generator 10 configured as described above will be described.

Figure 9:
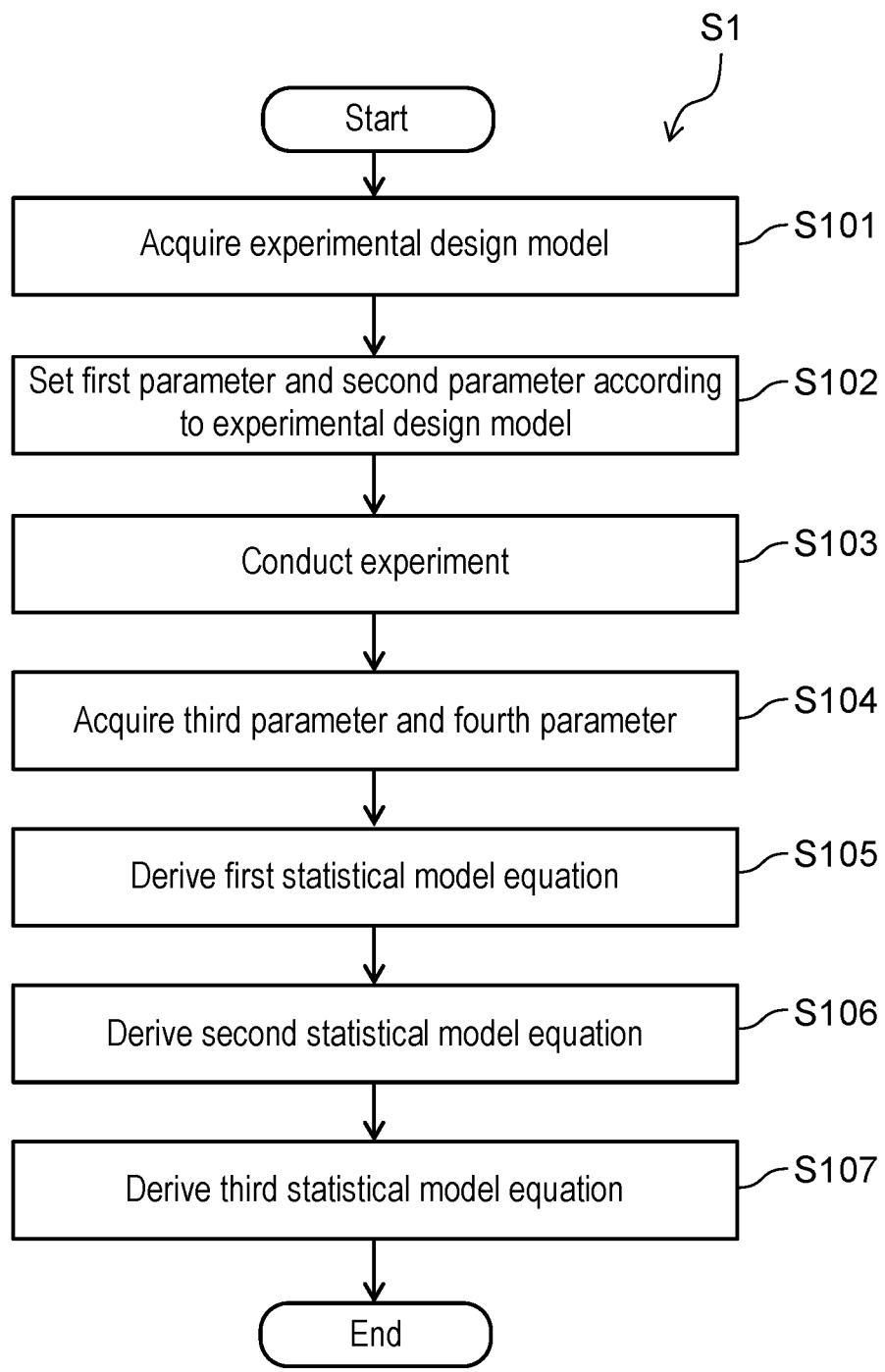
FIG. 9 is a flowchart illustrating processing executed by generator according to the exemplary embodiment.

FIG. 9 is a flowchart illustrating processing executed by generator 10 according to the present exemplary embodiment. The process illustrated in FIG. 9 is the processing included in step S1 of FIG. 2.

As illustrated in FIG. 9, in step S101, acquisition unit 11 acquires experimental design model 105.

In step S102, acquisition unit 11 sets the first parameter and the second parameter to be used in the experiment based on experimental design model 105 acquired in step S101.

In step S103, acquisition unit 11 executes an experiment by using the first parameter and the second parameter set in step S102.

In step S104, acquisition unit 11 acquires the third parameter and the fourth parameter output as a result of the experiment performed in step S103.

In step S105, derivation unit 12 derives the first statistical model equation by using the first parameter and the second parameter set in step S102 and the third parameter acquired in step S104.

In step S106, derivation unit 12 derives the second statistical model equation by using the first parameter and the second parameter set in step S102 and the fourth parameter acquired in step S104.

In step S107, derivation unit 12 derives the third statistical model equation by using the first statistical model equation derived in step S105 and the second statistical model equation derived in step S106.

Figure 10:
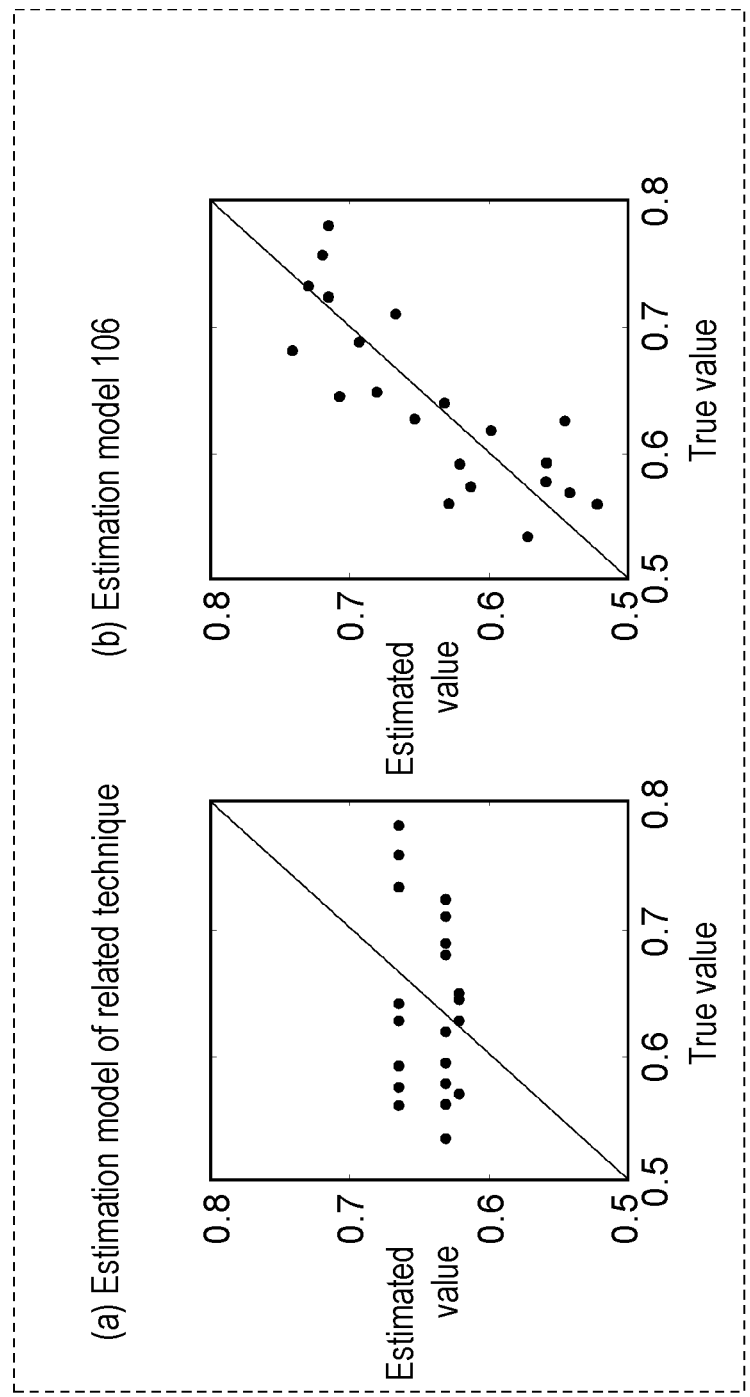
FIG. 10 is an explanatory diagram illustrating the accuracy of estimation of the estimation model according to the exemplary embodiment in comparison with a related technique.

FIG. 10 is an explanatory diagram illustrating the accuracy of estimation of the estimation model according to the present exemplary embodiment in comparison with a related technique.

FIG. 10A is a graph in which a true value is plotted on the horizontal axis and an estimated value is plotted on the vertical axis for the fourth parameter estimated by the estimation model of a related technique. Here, the related technique is a technique using an estimation model that estimates the fourth parameter by inputting a fixed value corresponding to the first parameter and the second parameter acquired by inline measurement into the second statistical model equation, unlike estimation model 106 in the present exemplary embodiment.

FIG. 10B is a graph in which a true value is plotted on the horizontal axis and an estimated value is plotted on the vertical axis for the fourth parameter estimated by estimation model 106 in the present exemplary embodiment.

The root mean squared error (RMSE) between the true value and the estimated value is 0.0625 in the related technique and 0.0415 in the present exemplary embodiment. It can be confirmed that the estimation accuracy in the present exemplary embodiment is 30% or higher than that in the related technique.

As described above, it is possible to estimate the parameters of the objective variables with a small number of experiments by the estimation of this exemplary embodiment, even if the explanatory variables include parameters for which measurement data is not collected inline.

Estimator 20

Next, estimator 20 will be described.

Figure 11:
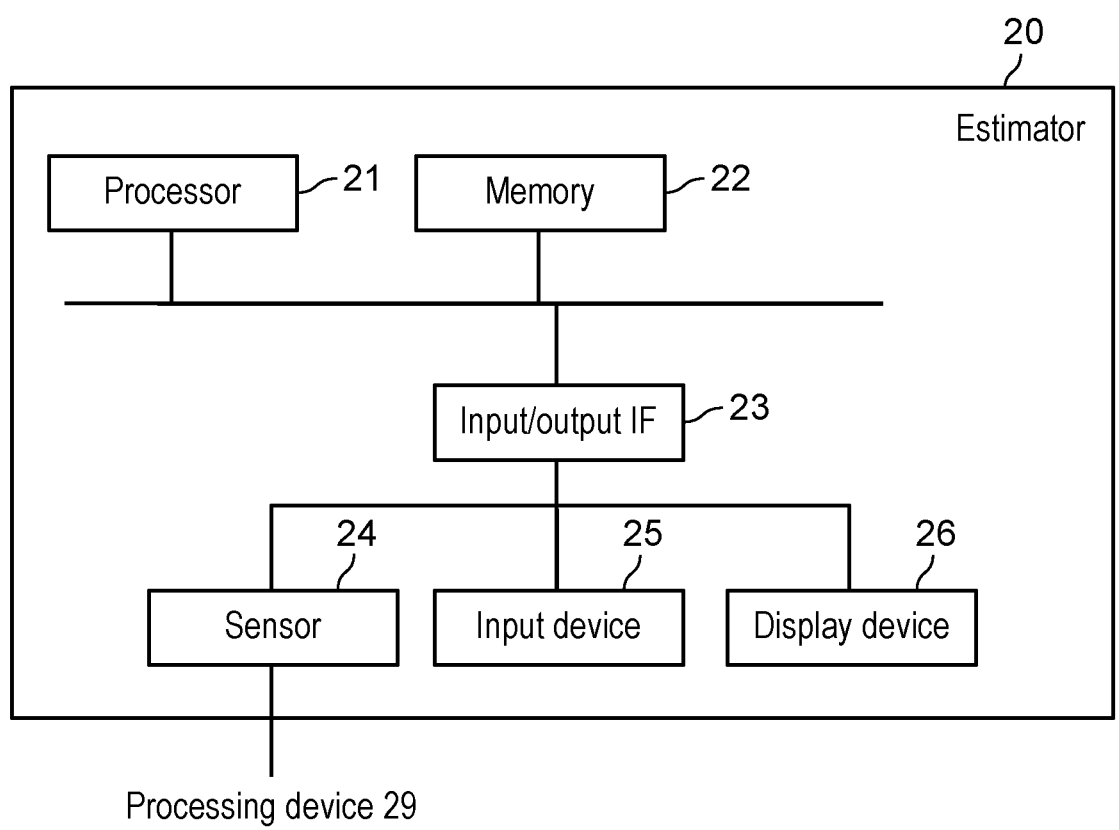
FIG. 11 is a block diagram illustrating a hardware configuration of an estimator according to the exemplary embodiment.

FIG. 11 is a block diagram illustrating a hardware configuration of estimator 20 according to the present exemplary embodiment.

Estimator 20 is realized by, for example, a computer and includes processor 21, memory 22, input/output IF 23, sensor 24, input device 25, and display device 26.

Processor 21 is an arithmetic unit that performs parameter estimation processing, and is, for example, a CPU.

Memory 22 is a storage device for storing a program or data, and is, for example, a random access memory (RAM). Estimation model 106 generated by generator 10 is stored in memory 22.

Input/output IF 23 is an interface device that exchanges data with each other between processor 21, memory 22, sensor 24, input device 25, and display device 26. Input/output IF23 is connected to each of the above devices.

The connection may be wired or wireless, or a combination thereof.

Sensor 24 is installed in processing device 29 to be measured inline. Processing device 29 is, for example, a laser welding device. Sensor 24 is, for example, a laser displacement meter that measures surface welding width 93 (see FIG. 4B) of the plate material to be welded.

Input device 25 is a device that receives an input of information regarding the first parameter to the fourth parameter, and is, for example, a keyboard or a touch panel.

Display device 26 is a device that displays information regarding the first parameter to the fourth parameter, and is, for example, a liquid crystal display (LCD) monitor.

Figure 12:
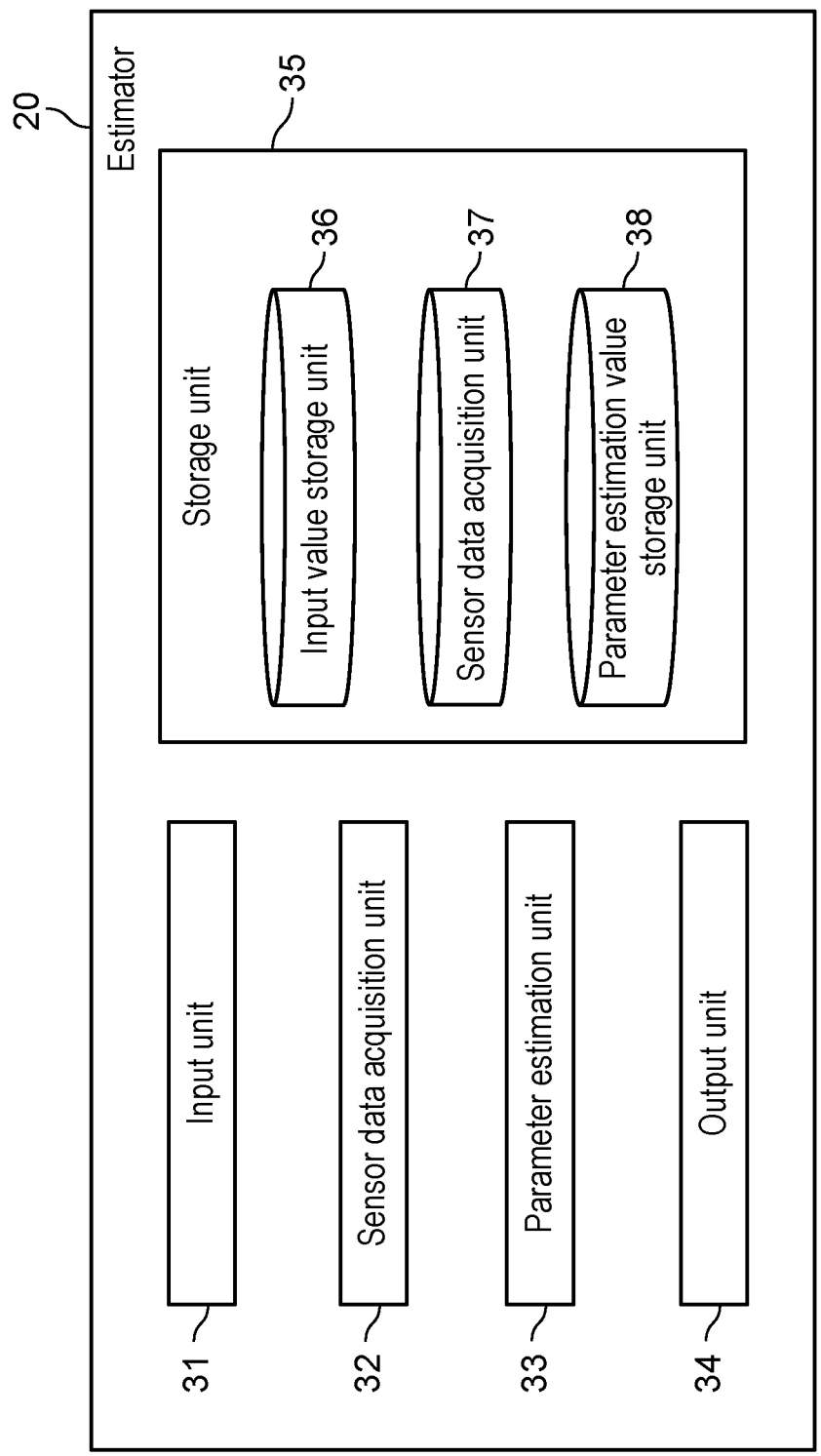
FIG. 12 is a block diagram illustrating a functional configuration of estimator according to the exemplary embodiment.

FIG. 12 is a block diagram illustrating a functional configuration of estimator 20 according to the present exemplary embodiment.

As illustrated in FIG. 12, estimator 20 includes input unit 31, sensor data acquisition unit 32, parameter estimation unit 33, output unit 34, and storage unit 35 as a functional configuration.

Input unit 31 is a functional unit that receives an input of determination value information such as a standard value from a user via input device 25, regarding first parameter 101, second parameter 102, third parameter 103, and fourth parameter 104. The input timing is, for example, when the model of processing device 29 is switched, but is not limited thereto. The value input here is registered in input value storage unit 36 of storage unit 35.

Sensor data acquisition unit 32 is a functional unit that acquires the measurement data of second parameter 102 and third parameter 103 from sensor 24 connected to processing device 29. Second parameter 102 is, for example, scan speed 92 (see FIG. 4A), and third parameter 103 is, for example, surface welding width 93 (see FIG. 4B) of the plate material to be welded. The data acquisition frequency can be set at random, but in the subsequent parameter estimation, the sequentially acquired data may be used each time, or an average value may be calculated from a plurality of pieces of acquired data for one type of work and the average value may be used as a representative value of the work. The acquired data is recorded in sensor data storage unit 37. Further, it is determined whether or not the acquired data meets the determination condition stored in input value storage unit 36, and if not, quality information indicating a defective product (NG) is output. The determination condition is, for example, a condition indicating a standard value or a condition indicating a normal range.

Parameter estimation unit 33 estimates fourth parameter 104 by inputting second parameter 102 and third parameter 103 recorded in sensor data storage unit 37 into estimation model 106 (that is, by using the above (Equation 3)). Fourth parameter 104 is, for example, interface welding width 95 between the plate materials (see FIG. 4B). The calculated estimated value of fourth parameter 104 is recorded in parameter estimation value storage unit 38. Further, it is determined whether or not the calculated estimation value of fourth parameter 104 meets to the determination condition stored in input value storage unit 36, and if not, quality information indicating a defective product (NG) is output. The determination condition is, for example, a condition indicating a standard value or a condition indicating a normal range.

Output unit 34 is a functional unit that outputs the data recorded in storage unit 35 or the determination result. Output unit 34 outputs, for example, by displaying the above data or the like on display device 26. Output unit 34 may output the above data or the like by voice, or may output the data by transmitting the data to another device by communication.

Storage unit 35 is a functional unit that stores various values and various data. Storage unit 35 includes input value storage unit 36, sensor data storage unit 37, and parameter estimation value storage unit 38. Storage unit 35 stores or reads a value or data by the functional units.

Figure 13:
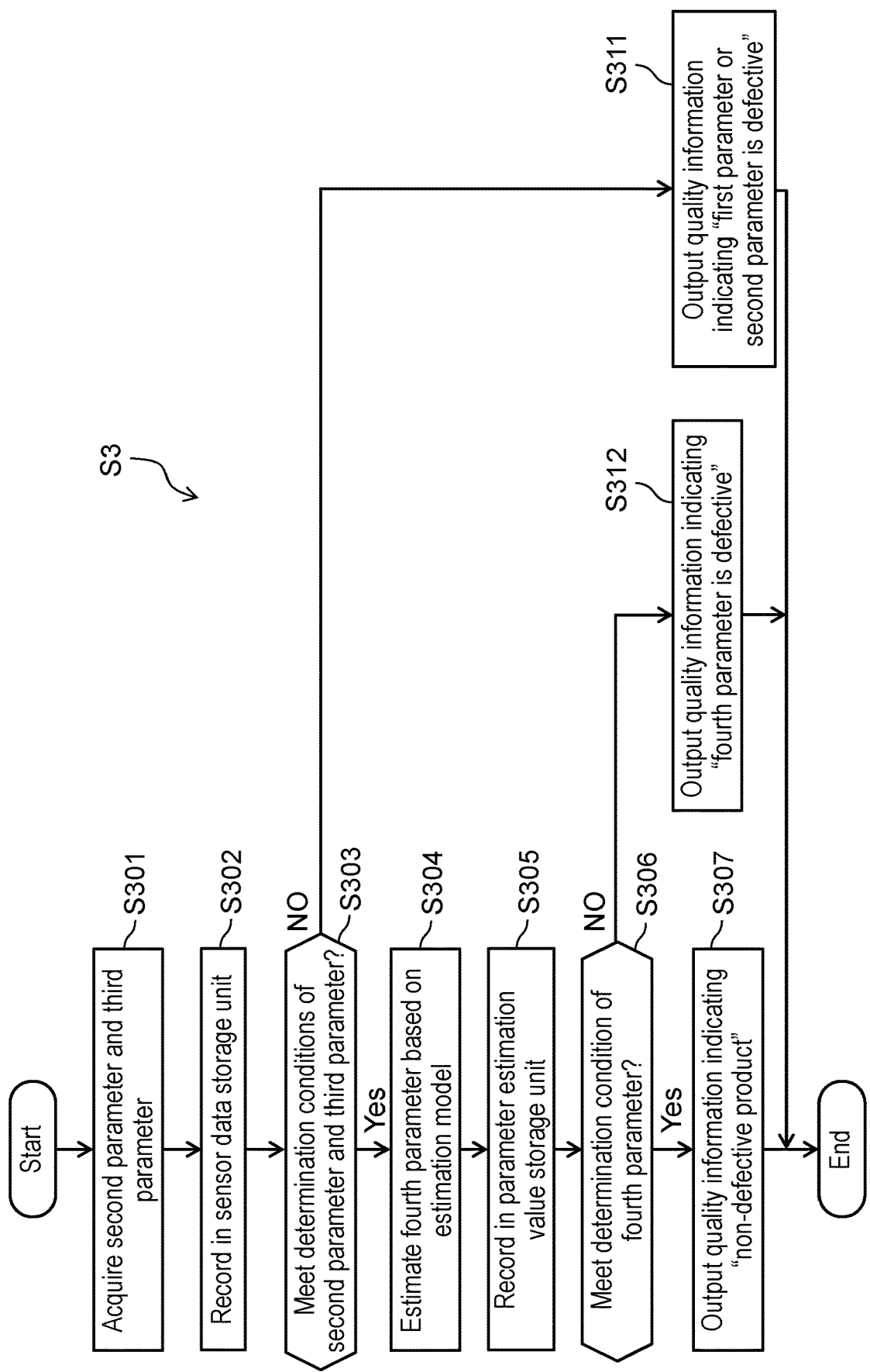
FIG. 13 is a flowchart illustrating processing executed by estimator according to the exemplary embodiment.

FIG. 13 is a flowchart illustrating processing executed by estimator 20 according to the present exemplary embodiment. The processing illustrated in FIG. 13 is the processing included in step S3 of FIG. 2.

In step S301, sensor data acquisition unit 32 acquires the measurement data of second parameter 102 and third parameter 103 from sensor 24.

In step S302, sensor data acquisition unit 32 stores the measurement data acquired in step S301 in sensor data storage unit 37.

In step S303, sensor data acquisition unit 32 determines whether or not the measurement data acquired in step S301 meets the determination condition. If the determination condition is met (Yes in step S303), step S304 is executed, and if not (No in step S303), step S311 is executed.

In step S304, parameter estimation unit 33 estimates fourth parameter 104 by inputting second parameter 102 and third parameter 103 recorded in sensor data storage unit 37 into estimation model 106 (that is, by using the above (Equation 3)).

In step S305, parameter estimation unit 33 stores fourth parameter 104 estimated in step S304 in parameter estimation value storage unit 38.

In step S306, parameter estimation unit 33 determines whether or not fourth parameter 104 estimated in step S304 meets the determination condition. If the determination condition is met (Yes in step S306), step S307 is executed, and if not (No in step S306), step S312 is executed.

In step S307, output unit 34 outputs quality information indicating a non-defective product (OK).

In step S311, output unit 34 outputs quality information indicating a defective product (NG) based on the fact that second parameter 102 or third parameter 103 does not meet the determination condition.

In step S312, output unit 34 outputs quality information indicating a defective product (NG) based on the fact that fourth parameter 104 does not meet the determination condition.

When the processing of steps S307, S311 or S312 is completed, the series of processing illustrated in FIG. 13 is completed.

For example, in a laser welding process, it is possible to measure interface welding width 95 between plate materials inline based on measurement data such as laser scan speed 92 or surface welding width 93 of a laser welded portion by a series of processing illustrated in FIG. 13. If interface welding width 95 is to be measured, the cross-sectional shape must be observed offline, but there is an effect that the interface welding width 95 can be estimated inline.

Modification Example

In the present exemplary embodiment, another mode of a generation method and an estimation method of generating a model that appropriately estimates the information indicating a result of processing will be described.

Figure 14:
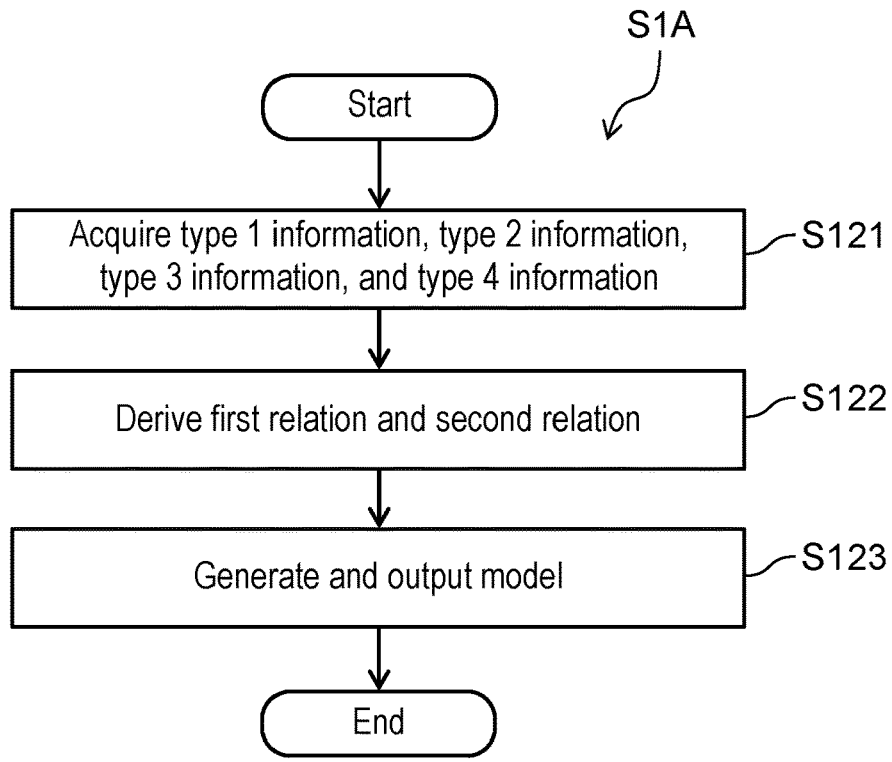
FIG. 14 is a flowchart illustrating processing executed by a generator according to a modification example of the exemplary embodiment.

FIG. 14 is a flowchart illustrating processing (that is, a generation method) executed by a generator according to the present modification example. The processing illustrated in FIG. 14 is another example of the processing included in step S1 of FIG. 2.

As illustrated in FIG. 14, in step S121, the generator performs an experiment of processing the device and acquires the type 1 information and the type 2 information indicating the processing conditions, and the type 3 information and the type 4 information indicating the results of the processing.

In step S122, the generator derives the first relation of the type 1 information, the type 2 information, and the type 3 information, and the second relation of the type 1 information, the type 2 information, and the type 4 information.

In step S123, the generator generates and outputs a model that estimates the type 4 information indicating a result of the processing by using the first relation and the second relation with the type 2 information and the type 3 information that are measured during the processing as inputs.

As a result, the generator can generate a model that appropriately estimates the information indicating the result of the processing.

Figure 15:
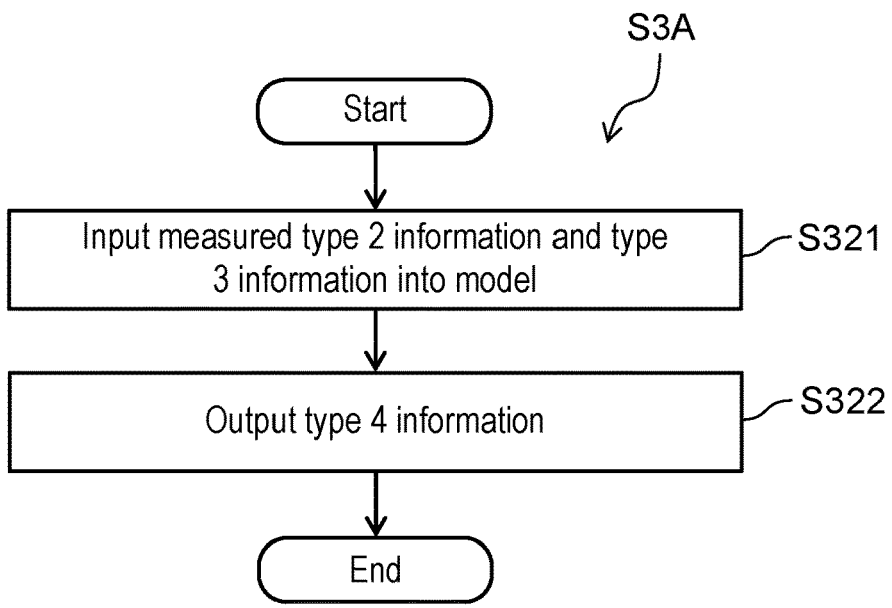
FIG. 15 is a flowchart illustrating processing executed by an estimator according to the modification example of the exemplary embodiment.

FIG. 15 is a flowchart illustrating processing (that is, an estimation method) executed by an estimator according to the present modification example. The processing illustrated in FIG. 15 is another example of the processing included in step S3 of FIG. 2.

In step S321, the estimator inputs the type 2 information and the type 3 information that are measured during processing into the model output by the above generator.

In step S322, the estimator outputs the type 4 information output by inputting the type 2 information and the type 3 information, as the estimation information that estimates the result of the processing.

Thereby, the estimator can estimate the information indicating the result of the processing by using the model that appropriately estimates the information indicating the result of the processing.

As described above, according to the generation method of the present exemplary embodiment, it is possible to obtain a model that estimates the type 4 information during the processing from the type 2 information and the type 3 information obtained during the processing by using the relation between the type 1 information, the type 2 information, the type 3 information, and the type 4 information obtained from the experiment. If this model is used, even if the type 4 information cannot be obtained during processing, if the type 2 information and the type 3 information can be obtained during processing, the type 4 information during processing can be obtained. Four kinds of information can be obtained by estimation. As described above, according to the above generation method, it is possible to generate a model that appropriately estimates the information indicating a result of processing. Further, when estimating the type 4 information, it is not necessary to perform a new experiment using the type 4 information as an output variable. Therefore, there is an effect that it is possible to avoid an increase in the number of experiments in order to acquire information that cannot be obtained during the processing.

In addition, it is possible to obtain the type 4 information by using the third equation derived from the first equation with equation modification. Therefore, according to the above generation method, it is possible to more easily generate a model that appropriately estimates the information indicating the result of the processing.

In addition, it is possible to easily estimate the type 1 information with the third equation from the measured values of the type 2 information and the type 3 information, and it is possible to estimate the type 4 information with the second equation from the estimated type 1 information and the measured value of the type 2 information. Therefore, according to the above generation method, it is possible to more easily generate a model that appropriately estimates the information indicating the result of the processing.

Further, when there is information that is not measured in the information indicating the processing conditions and there is information that is not measured in the information indicating the result of the processing, it is possible to appropriately estimate the information indicating the result of the processing. Therefore, according to the above generation method, even if there is information that is not measured during the processing, it is possible to generate a model that appropriately estimates the information indicating the result of the processing.

In addition, it is possible to more easily generate a model that appropriately estimates the information indicating a result of the processing in laser welding.

Further, according to the estimation method of the present exemplary embodiment, it is possible to appropriately estimate the information indicating the result of the processing by inputting the type 2 information and type 3 information obtained during the processing into the model.

In the above exemplary embodiment, each component may be configured by dedicated hardware or may be realized by executing a software program suitable for each component. Each component may be realized by a program execution unit such as a CPU or a processor reading and executing a software program recorded on a recording medium such as a hard disk or a semiconductor memory. Here, the software that realizes the generator and the estimator of the above exemplary embodiment is the following program.

That is, this program is a program for causing a computer to execute a generation method by a processor using a memory, the method including: performing an experiment of processing a device to acquire type 1 information and type 2 information indicating processing conditions, and type 3 information and type 4 information indicating results of the processing, deriving a first relation between the type 1 information, the type 2 information, and the type 3 information, and a second relation between the type 1 information, the type 2 information, and the type 4 information, and generating and outputting a model that estimates the type 4 information indicating a result of the processing by using the first relation and the second relation with the type 2 information and the type 3 information that are measured during the processing as inputs.

Further, this program is a program for causing a computer to execute an estimation method for inputting the type 2 information and the type 3 information that are measured during the processing into the model that is output by the above generation method, and outputting the type 4 information that is output by inputting the type 2 information and the type 3 information into the model as estimation information that estimates a result of the processing.

Although the estimator and the like according to one or more aspects have been described above based on the exemplary embodiment, the present disclosure is not limited to this exemplary embodiment. As long as the gist of the present disclosure is not deviated, various modifications that can be conceived by those skilled in the art may be applied to the present exemplary embodiment, and a form constructed by combining components in different exemplary embodiments may be also included within the scope of one or more exemplary embodiments.

The model generation method, parameter estimation method, and system according to the present disclosure can estimate a parameter of an objective variable with a small number of experiments even when explanatory variables include parameters for which measurement data is not collected inline, and are useful as a model generation method, parameter estimation method, and system.

What is claimed is:

1. A generation method that is executed by a processor executing instructions stored in a memory, the method comprising:

performing an experiment of a processing operation on a device in order to acquire type 1 information, type 2 information, type 3 information, and type 4 information, if the performed experiment is a simulation experiment the type 1 information and the type 2 information each indicating estimated processing conditions associated with the device during the processing operation, and the type 3 information and the type 4 information each indicating estimated results of the processing operation performed on the device, and if the performed experiment is an actual machine experiment, the type 1 information and the type 2 information each indicating actual processing conditions associated with the device during the processing operation, and the type 3 information and the type 4 information each indicating actual results of the processing operation performed on the device;

deriving a first statistical model equation expressing a first mathematical relationship between the type 1 information, the type 2 information, and the type 3 information, and deriving a second statistical model equation expressing a second mathematical relationship between the type 1 information, the type 2 information, and the type 4 information; and generating and outputting an estimation model that estimates information indicating a target result of an inline processing operation to be performed on the device by using the first statistical model equation and the second statistical model equation and the type 2 information and the type 3 information as inputs, wherein the information output by the estimation model is used to perform the inline processing operation on the device in a manufacturing environment that is not the experiment in order to achieve the target result.

2. The generation method of claim 1, wherein
the first statistical model equation outputs the type 3 information by using the type 1 information and the type 2 information as inputs,
the second statistical model equation outputs the type 4 information by using the type 1 information and the type 2 information as inputs, and
the estimation model includes a third statistical model equation that is derived from the first statistical model equation and outputs the type 1 information by using the type 2 information and the type 3 information as inputs.

3. The generation method of claim 2, wherein
the estimation model includes a model with the second statistical model equation, and that acquires the type 4 information that is output by the second statistical model equation with the type 1 information that is output by the third statistical model equation with the type 2 information and the type 3 information that are estimated during the processing operation as inputs, and the type 2 information that is estimated during the processing operation as inputs.

4. The generation method of claim 1, wherein
the type 1 information and the type 4 information are predetermined and estimated information as information that is not measured during the processing operation, the type 2 information and the type 3 information are predetermined and estimated information as information that is measured during the processing operation.

5. The generation method of claim 1, wherein
the processing operation is laser welding,
the type 1 information includes a gap width between plates to be welded in the laser welding,
the type 2 information includes a laser scan speed in the laser welding,
the type 3 information includes a surface welding width of a laser welded portion in the laser welding, and
the type 4 information includes an interface welding width of the laser welded portion in the laser welding.

6. An estimation method comprising:
inputting the type 2 information and the type 3 information that are measured during the processing operation into the estimation model that is output by the generation method of claim 1; and
outputting the type 4 information that is output by inputting the type 2 information and the type 3 information into the estimation model, wherein the type 4 information estimates a target result of the processing operation on the device.

7. A generator comprising:
a processor; and
a memory storing instruction and that is connected to the processor, wherein
the processor is configured to, by executing the instructions in the memory,
perform an experiment of a processing operation on a device in order to acquire type 1 information, type 2 information, type 3 information, and type 4 information, if the performed experiment is a simulation experiment the type 1 information and the type 2 information each indicating estimated processing conditions associated with the device during the processing operation, and the type 3 information and the type 4 information each indicating estimated results of the processing operation performed on the device, and if the performed experiment is an actual machine experiment, the type 1 information and the type 2 information each indicating actual processing conditions associated with the device during the processing operation, and the type 3 information and the type 4 information each indicating actual results of the processing operation performed on the device,
derive a first statistical model equation expressing a first mathematical relationship between the type 1 information, the type 2 information, and the type 3 information, and derive a second statistical model equation expressing a second mathematical relationship between the type 1 information, the type 2 information, and the type 4 information, and
generate and output an estimation model that estimates information indicating a target result of an inline the processing operation performed on the device by using the first statistical model equation and the second statistical model equation with the type 2 information and the type 3 information as inputs,
wherein the information output by the estimation model is used to perform the inline processing operation in a manufacturing environment that is not the experiment in order to achieve the target result.

8. An estimator comprising:
a processor and a memory storing instructions and connected to the processor, wherein
the processor is configured to, by executing the instructions in the memory, output the information indicating the target result of the inline processing operation on the device, which was generated by inputting the type 2 information and the type 3 information that are estimated as measured during the processing operation into the estimation model that is output by the generator of claim 7.

9. The generator of claim 7, wherein
the processing operation is laser welding,
the type 1 information includes a gap width between plates to be welded in the laser welding,
the type 2 information includes a laser scan speed in the laser welding,
the type 3 information includes a surface welding width of a laser welded portion in the laser welding, and
the type 4 information includes an interface welding width of the laser welded portion in the laser welding.

* * * * *